United States Patent
Pieron et al.

(10) Patent No.: US 10,467,856 B2
(45) Date of Patent: **\*Nov. 5, 2019**

(54) SYSTEM AND METHOD FOR IMPLEMENTING A REFUND CALCULATOR IN A GAME

(71) Applicant: Kabam, Inc., San Francisco, CA (US)

(72) Inventors: Luc Pieron, San Francisco, CA (US); Peter Im, San Bruno, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/138,686

(22) Filed: Sep. 21, 2018

(65) Prior Publication Data

US 2019/0139359 A1    May 9, 2019

Related U.S. Application Data

(63) Continuation of application No. 13/915,416, filed on Jun. 11, 2013, now Pat. No. 10,083,573.

(51) Int. Cl.

| | |
|---|---|
| *A63F 13/00* | (2014.01) |
| *A63F 9/24* | (2006.01) |
| *G07F 17/00* | (2006.01) |
| *G07F 19/00* | (2006.01) |
| *G07F 17/32* | (2006.01) |
| *G06Q 30/06* | (2012.01) |

(52) U.S. Cl.
CPC ..... *G07F 17/3244* (2013.01); *G06Q 30/0601* (2013.01); *G07F 17/3255* (2013.01); *A63F 2300/575* (2013.01)

(58) Field of Classification Search
CPC .. G07F 17/32; G07F 17/3244; G07F 17/3255; A63F 2300/575; A63F 13/00; G06Q 30/06; G06Q 30/0601
See application file for complete search history.

(56) References Cited

U.S. PATENT DOCUMENTS

| | | |
|---|---|---|
| 6,292,786 B1 | 9/2001 | Deaton |
| 6,345,261 B1 | 2/2002 | Feidelson |
| 6,516,302 B1 | 2/2003 | Deaton |
| 7,677,979 B2 | 3/2010 | VanLuchene |
| 8,271,365 B2 | 9/2012 | Jung |
| 8,277,302 B2 | 10/2012 | Walker |
| 8,328,642 B2 | 12/2012 | Mosites |
| 8,353,761 B2 | 1/2013 | Kelly |
| 8,380,532 B1 | 2/2013 | Zaccaro |
| 8,452,654 B1 | 5/2013 | Wooters |
| 8,719,086 B1 | 5/2014 | Gala |
| 10,083,573 B1 * | 9/2018 | Pieron ................. G07F 17/3244 |
| 2002/0073043 A1 | 6/2002 | Herman |
| 2002/0165787 A1 | 11/2002 | Bates |
| 2003/0014423 A1 | 1/2003 | Chuah |
| 2003/0101124 A1 | 5/2003 | Semret |

(Continued)

*Primary Examiner* — Milap Shah
(74) *Attorney, Agent, or Firm* — Esplin & Associates, PC (57) ABSTRACT

One aspect of the disclosure relates to implementing a refund calculator in an online game. The refund calculator may provide the ability to prioritize what users may receive items, troops, and/or any other in-game parameters. The refund calculator may provide the ability to determine how many items and/or troops the user may be refunded, the time frame in which the user receives the items, troops and/or other aspects of a refund.

16 Claims, 5 Drawing Sheets

(56) References Cited

U.S. PATENT DOCUMENTS

| | | |
|---|---|---|
| 2003/0126033 A1 | 7/2003 | Evans |
| 2004/0143852 A1 | 7/2004 | Meyers |
| 2005/0102188 A1 | 5/2005 | Hutchison |
| 2006/0206386 A1 | 9/2006 | Walker |
| 2006/0287072 A1 | 12/2006 | Walker |
| 2007/0021192 A1 | 1/2007 | Tamimoto |
| 2007/0111770 A1 | 5/2007 | Van Luchene |
| 2007/0288387 A1 | 12/2007 | Park |
| 2008/0004094 A1 | 1/2008 | Mueller |
| 2008/0004116 A1 | 1/2008 | Van Luchene |
| 2008/0125207 A1 | 5/2008 | Borissov |
| 2008/0215361 A1 | 9/2008 | Nunnari |
| 2008/0220876 A1 | 9/2008 | Mehta |
| 2008/0288343 A1 | 11/2008 | Ho |
| 2009/0061998 A1 | 3/2009 | Popovich |
| 2009/0287557 A1 | 11/2009 | Etheredge |
| 2009/0307110 A1 | 12/2009 | Betzler |
| 2010/0210349 A1 | 8/2010 | Blair |
| 2011/0028160 A1 | 2/2011 | Roeding |
| 2011/0244950 A1 | 10/2011 | Walker |
| 2012/0054000 A1 | 3/2012 | Boppert |
| 2012/0226616 A1 | 9/2012 | Amar |
| 2012/0258805 A1 | 10/2012 | Harris |
| 2012/0278247 A1 | 11/2012 | Amar |
| 2013/0006736 A1 | 1/2013 | Bethke |
| 2013/0006805 A1 | 1/2013 | Ulli |
| 2013/0036009 A1 | 2/2013 | Heiser |
| 2013/0088615 A1 | 4/2013 | Altieri |
| 2013/0184075 A1 | 7/2013 | Kim |
| 2013/0215116 A1 | 8/2013 | Siddique |
| 2013/0262214 A1 | 10/2013 | Baird |
| 2014/0073416 A1 | 3/2014 | Toyama |
| 2014/0163706 A1 | 6/2014 | Wilen |
| 2014/0194197 A1 | 7/2014 | Graziosi |
| 2014/0236775 A1 | 8/2014 | Gill |
| 2014/0274313 A1 | 9/2014 | Bala |
| 2014/0316940 A1 | 10/2014 | Kirchenbauer |
| 2015/0005052 A1 | 1/2015 | Harrington |
| 2015/0039427 A1 | 2/2015 | Elbouchikhi |
| 2015/0332550 A1 | 11/2015 | Moore, Jr. |
| 2016/0063816 A1 | 3/2016 | Argue |
| 2017/0333785 A1 | 11/2017 | Herring |
| 2019/0139539 A1 | 5/2019 | Nuzzi |

\* cited by examiner

SYSTEM AND METHOD FOR IMPLEMENTING A REFUND CALCULATOR IN A GAME

FIELD

The disclosure relates to implementing a refund calculator in an online game.

BACKGROUND

In various online games, players contact customer support to request in-game refunds (e.g., troop refunds and/or item refunds). When customer support provides players these refunds, the game does not remain fair and balanced game. In some implementations, if one player receives all the troops and/or virtual that they're requesting, the game becomes out of balance and the player may no longer spend any more money since they have received what they have requested.

SUMMARY

One aspect of the disclosure relates to implementing a refund calculator in an online game. The refund calculator may provide the ability to prioritize what users may receive items, troops, and/or any other in-game parameters. The refund calculator may provide the ability to determine how many items and/or troops the user may be refunded, the time frame in which the user receives the items, troops and/or other aspects of a refund.

A system configured to implement a refund calculator in an online game may include one or more processors configured to execute compute program modules. The program modules may comprise a game module, a user module, an interaction module, relationship module, a network module, an item request module, an item determination module, a user valuation module, a power module, a refund activity module, a lifetime module, a calculation module, a distribution module, and/or any other modules.

The game module may be configured to execute a game instance of a game space. The game instance may be used to facilitate presentation of views of the game space to users. The game instance may be configured to facilitate interaction of the users with the game space and/or each other by performing operations in the game instance in response to commands and/or any other input received from the users.

A user module may be configured to store inventories of items that are available to the users in the game space. The inventories may include a first inventory of items available to a first user in the game space. The items may include a first virtual item and/or any other item. A virtual item may be an item that can be used in the game instance by the user. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

An item request module may be configured to receive refund requests for sets of one or more virtual items to be refunded into the inventories of the users in the game space. The requests may include a first refund request from the first user and/or any other user.

A user valuation module may be configured to determine user values based on past user spending. The user values may include a first user value and/or any other value. The user valuation module may be configured such that the amount of past user spending in the game may be monitored by one or more of: a spend velocity, a spend frequency, a total amount spent. Past user spending may be determined for the first user during an event time period and/or during any other time. The user valuation module may be configured to determine a start time and an end time for the event time period and/or for any other period. The user valuation module may be configured to determine the spend parameter value for the first user and/or any other user during the event time period. The spend parameter value for the first user may characterize one or more aspects of spending by the first user on virtual items through a store interface during the event time period and/or any other time period.

A power module may be configured to determine an amount of power of the users based on in-game resources of the users. The amount of power of the users may include a first amount of power corresponding to the first user and/or any other user.

A refund activity module may be configured to determine a refund metric that reflects one or more of a number of past refund requests, a value of refunds previously dispersed, and/or other aspects of previous refunds and/or refund requests. A refund activity module may determine an amount of refund requests of the users based on a period of time and/or any other parameter. The amount of refund requests may include a first amount of refund requests from the first user and/or any other user.

A lifetime module may be configured to determine the lifetime of the users based the amount of time the users have played the game. The lifetime of users may be based on how long the user has been playing the game. The lifetime of users may also include churn metrics. Churn metrics may be based on an in game prediction with respect to how likely it is a user will leave the game and/or win the game. The lifetime may include a first lifetime of a first user and/or any other user.

A calculation module may be configured to determine refunds to be provided to the users in response to the refund requests. The calculation module may be configured such that a first refund may be provided to the first user based on the user module and the inventory valuation metric for the first user. The calculation module may be configured to determine the quantity of one or more virtual items to provide the users based on the first amount of power and/or any other power. The calculation module may be configured to determine the quantity of one or more virtual items to provide the users based on the first amount of refund requests. The calculation module may be configured to determine the quantity of one or more virtual items to provide the users based on the first lifetime and/or any other time period.

A distribution module may be configured to distribute the refunds to the users within the game space. The distribution module may be configured to distribute the refunds upon conclusion of the event time period and/or during any other time.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the

DETAILED DESCRIPTION

Figure 1:
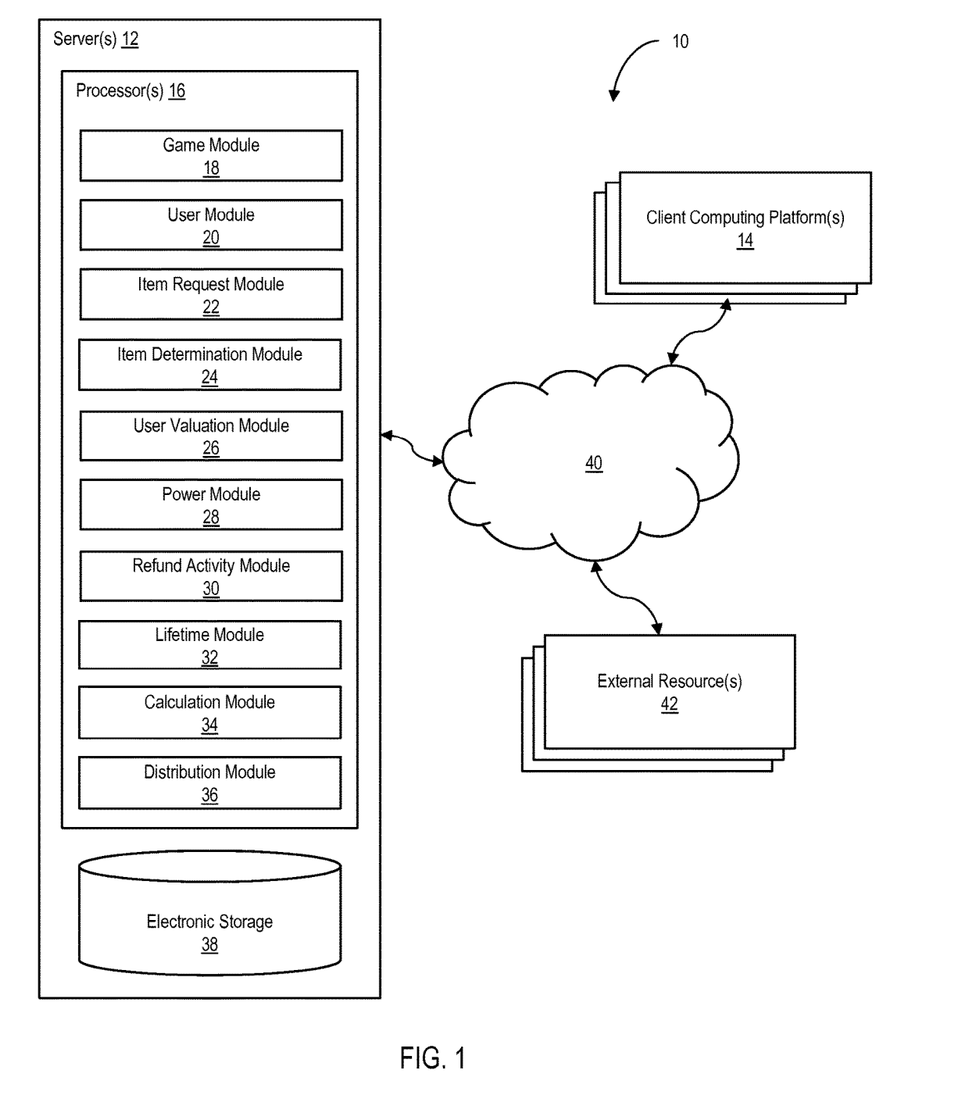
FIG. 1 illustrates an exemplary system configured to implement a refund calculator in an online game, according to an aspect of the invention.

FIG. 1 illustrates a system 10 configured to implement a refund calculator in an online game, according to an aspect of the invention. The program modules may comprise a game module 18, a user module 20, an interaction module, a network module, a store module, an item request module 22, an item determination module 24, a user valuation module 26, a power module 28, a refund activity module 30, a lifetime module 32, a calculation module 34, a distribution module 36 and/or any other modules. In some implementations, system 10 may include a game server(s) 12. The game server(s) 12 may host a game space in which an online game takes place. The game server(s) 12 may be configured to communicate with one or more client computing platforms 14 according to a client/server architecture. The users may access system 10 and/or the virtual space via client computing platforms 14.

The game server(s) 12 may be configured to execute one or more computer program modules. The computer program modules may include one or more of a game module 18, a user module 20, an interaction module, a network module, a store module, an item request module 22, an item determination module 24, a user valuation module 26, a power module 28, a refund activity module 30, a lifetime module 32, a calculation module 34, a distribution module 36 and/or any other modules.

The game module 18 may be configured to execute a game instance of a game space. The game instance may be used to facilitate presentation of views of the game space to users. The game instance may be configured to facilitate interaction of the users with the game space and/or each other by performing operations in the game instance in response to commands and/or any other input received from the users.

The game module 18 may be configured to implement the instance of the virtual space executed by the computer modules to determine state of the virtual space. The state may then be communicated (e.g., via streaming visual data, via object/position data, and/or other state information) from server(s) 12 to client computing platforms 14 for presentation to users. The state determined and transmitted to a given client computing platform(s) 14 may correspond to a view for a user character being controlled by a user via the given client computing platform(s) 14. The state determined and transmitted to a given client computing platform(s) 14 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by game module 18 is not intended to be limiting. The game module 18 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game module 18, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server(s) 12 (e.g., through game module 18).

The system may comprise a user module 20 configured to store inventories of virtual items that are available to users in the game space. The inventories may include a first inventory and/or any other inventory of virtual items available to a first user in the game space. The user module 20 may be configured to access and/or manage one or more user profiles and/or user information associated with users of the system 10. The one or more user profiles and/or user information may include information stored by game server(s) 12, one or more of the client computing platforms 14, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The user module 20 may be configured to store inventories of virtual items including resources that are available to users in the virtual space. Various matters may be collected in an inventory. These matters may include, but are not limited to, virtual items, virtual resources, character attributes, character skills, and/or virtual currency. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, non-player characters (NPCs), building materials, potions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

The user maintains an inventory for the user's character in which virtual awards may be collected. The inventory may be accessed through an interface. As the character progresses through the game it may receive access to higher-level gear. Higher-level gear may be more powerful and/or effective within the game. This may include having parameters (e.g., hit points, attack strength, defense points, speed, etc.) that enhance the functionality of the gear in the game. The player may be able to review items within the player's inventory and equip the character with an item appropriate to the current game situation. Items may be dragged from the inventory to a preview window. As items are selected, they may appear either on or next to the character. For example, if the character is currently not wearing any armor and/or accessories, armor and accessories such as a cape may be added by accessing the character's inventory. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

Players within the game may acquire virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. A player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

Virtual currency may be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

Multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. Virtual cash may also be awarded for leveling up in the game.

The interaction module may be configured to monitor interactions of the users with the virtual space and/or each other within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction module in monitoring the interactions of the users may be stored to the user profiles managed by user module 20.

At a given time, interaction module may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or other taking some other action indicating ongoing and contemporaneous engagement with the virtual space.

The interaction module may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

Network module of the game server(s) 12 may be configured to maintain a connection to the one or more client computing platforms 14. For example, the network module may maintain one or more communication lines or ports to enable connection and/or exchange of information with a network 40 and/or other computing platforms 14. Information such as state information, game state and game logic may be communicated via network module. The network module may be configured to receive information from the client computing platform(s) 14 as well.

A store module may be configured to present a store interface to the users. The store interface may present offers to users to buy item instances of virtual items. The virtual items may include a first virtual item and/or any other item.

A virtual item may be an item that can be used in the game instance by the user. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

A store module may be configured to effectuate presentation to the users of offers to purchase resources. The offers may include a first offer for the first user to purchase a first set of one or more virtual items. The virtual items may include a virtual good, a virtual currency, and/or other virtual items as described above. For example, the store module may be configured such that the offers presented to the first user may be restricted to offers having prices in a first price range. The first price range may be determined based on the user metric for the first user, and/or the user metric for other users. The store module may be configured such that the first price range may change as participation by the first user in the game causes the user metric for the first user to change. The store module may be configured such that the first price range may be bounded by one or more both of a minimum value and/or a maximum value. The store module may be configured such that the offers having prices below the minimum value may not be available for purchase by the first user. The store module may be configured such that offers having prices above the maximum value may be locked. This may mean the offers having prices above the maximum value may be unavailable for purchase by the first user independent from whether the first user has consideration sufficient to purchase such offers. Such offers may become unlocked as the maximum value of the price range is adjusted above the prices of such offers.

For example, players' experience with pricing of in-game goods may be associated with their progress in the game. In some implementations, the higher the level of the player, the lower the in-game goods may cost. Depending on the level of the player, the goods available to the player may change. Overall, the more the player advances in the game, new items may be unlocked to the player for purchase. Goods previously provided to the player for purchase may or may not be accessible to the player depending on the player's level.

An item request module 22 may be configured to receive refund requests for sets of one or more virtual items to be refunded into the inventories of the users in the game space. The requests may include a first refund request from the first user and/or any other user. The requests may include a combination of virtual items, and/or a category of virtual items. The requests may include virtual items the user is currently in possession of, and/or virtual items the user does not own.

A user valuation module 26 may be configured to determine user values based on past user spending. The user values may include a first user value and/or any other value. The user valuation module may be configured such that the amount of past user spending in the game may be monitored by one or more of: a spend velocity, a spend frequency, a total amount spent. Past user spending may be determined for the first user during an event time period and/or during any other time. The user valuation module 26 may be configured to determine a start time and an end time for the event time period and/or for any other period. The user valuation module 26 may be configured to determine the spend parameter value for the first user and/or any other user during the event time period. The spend parameter value for the first user may characterize one or more aspects of spending by the first user on virtual items through a store interface during the event time period and/or any other time period. The user value may directly correlate to the amount a user spends in game. This may be any type of ratio implementation and/or based on spending tiers.

In some implementations, a user may spend over a certain time frame and then at the end of that time frame, the user may obtain a user value based on their spending history. There may be several tiers to this example. If a user spends 500 units of virtual currency, the user may be classified as a certain tier spender. The user value may increases once the user hits the larger tiers of spending. For example, if the user spends 1,000 units of virtual currency, the user may be classified as a higher tier spender. If the user spends 2,000 units of virtual currency, the user might be classified as a top tier spender. In some implementations, the user value may be based on the user's spending tier.

A power module 28 may be configured to determine an amount of power of the users based on in-game resources of the users. In game resources may comprise any of the virtual items listed above. The amount of power of the users may include a first amount of power corresponding to the first user and/or any other user. The amount of power of the users may be configured based on any in game performance parameter, and/or any aspect of a game by which a player character's performance can be measured. Game parameters shall include, but not be limited to: completing all or part of a mission; playing for a certain period of time; winning a match against another player character or computer generated character; reaching a certain level or score; using or obtaining an ability or technology; kill/death ratios; obtaining, creating or modifying an object; solving a puzzle; accuracy with weapons; effective use of the proper weapon; killing a certain character/creature; getting through or to a certain geographic area; decreasing or increasing Karma Points; getting, buying, exchanging or learning a new skill or player attribute; having a child; getting married; obtaining, buying, trading, producing or developing raw materials; producing goods or services; earning income; earning a higher rank in an army; winning an election among two or more player characters; achieving deity or other status; improving player character status or caste; assisting other player characters with any of the above; speed of accomplishing or changing the rate or trends of any or all of the above.

A refund activity module 30 may be configured to determine a refund metric that reflects one or more of a number of past refund requests, a value of refunds previously dispersed, and/or other aspects of previous refunds and/or refund requests. A refund activity module may determine an amount of refund requests of the users based on a period of time and/or any other parameter. The amount of refund requests may include a first amount of refund requests from the first user and/or any other user.

A lifetime module 32 may be configured to determine the lifetime of the users based the amount of time the users have played the game. The lifetime of users may be based on how long the user has been playing the game. The lifetime of users may also include churn metrics. Churn metrics may be based on an in game prediction with respect to how likely it is a user will leave the game and/or win the game. The lifetime may include a first lifetime of a first user and/or any other user.

A calculation module 34 may be configured to determine refunds to be provided to the users in response to the refund requests. The calculation module 34 may be configured such that a first refund may be provided to the first user based on the user module and the inventory valuation metric for the first user. The calculation module 34 may be configured to determine the quantity of one or more virtual items to provide the users based on the first amount of power and/or any other power. The calculation module 34 may be configured to determine the quantity of one or more virtual items to provide the users based on the first amount of refund requests. The calculation module 34 may be configured to determine the quantity of one or more virtual items to provide the users based on the first lifetime and/or any other time period.

The calculation module 34 may be configured to determine the refunds to be provided to the users in response to any of the metrics listed above (e.g., item requests, item determinations, user valuations, user poser, refund activity, user lifetime), and/or any other in-game metrics. Metrics may be calculated and used to determine the nature and/or quantity of which virtual items may be refunded to the user.

The user metric may quantify one or more of a progress within the game, a power level within the game, a skill level within the game, a level of virtual technology advancement within the game, success within the game as a whole or within certain types of gameplay (e.g., player-versus-player gameplay, player-versus-environment gameplay, harvesting gameplay, and/or other gameplay types), and/or other aspects. A metric may be classified as a status metric or a predictive metric. A status metric characterizes behavioral information of a set of on-line entities where the behavioral information is related to at least one activity of the on-line entities within the persistent virtual environment. Example status metrics include, without limitation, a prominence metric, a centrality degree metric, a cohesive subgroup metric, a group level equivalence metric, a leadership metric, a strength of ties metric, an interactivity metric, a topic of interaction metric, a role metric, a social accounting metric, a game-play metric, a modeling metric, and an interaction topic metric as well as other metrics. These metrics are subsequently briefly described.

Predictive metrics can, for example, evaluate the change in a status metric over time. Example predictive metrics include, without limitation: a churn metric, a compatibility metric, a scheduling metric, a content consumption metric, an environmental balance metric, a survival metric, and an economic metric. "Churn" metrics predict the probability of a player leaving the persistent virtual environment, based on the player's past interaction patterns. Compatibility metrics indicate whether or not a player's play style will match a proposed player association or whether the player's play style matches that of the player association to which he/she is a member. Scheduling metrics predict the probability of a player being available for a future joint activity, so that such activities can be planned in advance. Content consumption metrics predict when players will have exhausted the persistent virtual environment's resources, in order to plan timely expansions to the persistent virtual environment. Environmental balance metrics predict the effects of a design change on the persistent virtual environment, such as removing a given "profession" or certain items from the persistent virtual environment. Economic metrics predict inflation, trade volume, and other variables in order to maintain the balance of trade in the persistent virtual environment. The survival metric indicates the health of a player association.

The predictive metrics can include those that develop a time-series of single or combinations of status metrics (weighted or un-weighted) that represent trends; metrics that represent heuristically determined conditions relevant to the predicted health of the persistent virtual environment; metrics based on a vector of attributes representing characteristics of the on-line entity such that the vectors can be used to classify on-line entities and to determine the characteristics of successful on-line entities; and to determine whether on-line entities have characteristics that are progressing toward or away from the characteristics of successful online entities. The classification of the on-line entities can utilize a Bayesian network, spectral analysis, nearest neighbor techniques or any other classification mechanism.

A distribution module 36 may be configured to distribute the refunds to the users within the game space. The distribution module 36 may be configured to distribute the refunds upon conclusion of the event time period and/or during any other time.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

The game server(s) 12, client computing platform(s) 14, and/or external resource(s) 42 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game server(s) 12, client computing platform(s) 14, and/or external resource(s) 42 may be operatively linked via some other communication media.

Game server(s) 12 may include electronic storage 38, one or more processors 16, and/or other components. Game server(s) 12 may include communication lines, or ports to enable the exchange of information with a network 40 and/or other computing platforms 14. Illustration of game server(s) 12 in FIG. 1 is not intended to be limiting. Game server(s) 12 may include a plurality of hardware, software, and/or firmware components operating together to provide the functionality attributed herein to game server(s) 12. For example, game server(s) 12 may be implemented by a cloud of computing platforms operating together as game server(s) 12.

Electronic storage 38 may comprise non-transitory storage media that electronically stores information. The electronic storage media of electronic storage 38 may include one or both of system storage that is provided integrally (i.e., substantially non-removable) with game server(s) 12 and/or removable storage that is removably connectable to game server(s) 12 via, for example, a port (e.g., a USB port, a firewire port, etc.) or a drive (e.g., a disk drive, etc.). Electronic storage 38 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 38 may include one or more virtual storage resources (e.g., cloud storage, a virtual private network, and/or other virtual storage resources). Electronic storage 38 may store software algorithms, information determined by processor 16, information received from game server(s) 12, information received from client computing platform(s) 14, and/or other information that enables game server(s) 12 to function as described herein.

Processor(s) 16 is configured to provide information processing capabilities in game server(s) 12. As such, processor(s) 16 may include one or more of a digital processor, an analog processor, a digital circuit designed to process information, an analog circuit designed to process information, a state machine, and/or other mechanisms for electronically processing information. Although processor(s) 16 is shown in FIG. 1 as a single entity, this is for illustrative purposes only. In some implementations, processor(s) 16 may include a plurality of processing units. These processing units may be physically located within the same device, or processor(s) 16 may represent processing functionality of a plurality of devices operating in coordination. The processor(s) 16 may be configured to execute modules 18, 20, 22, 26, 28, 30, 32, 34, 36 and/or 38. Processor(s) 16 may be configured to execute modules 18, 20, 22, 26, 28, 30, 32, 34, 36 and/or 38 by software; hardware; firmware; some combination of software, hardware, and/or firmware; and/or other mechanisms for configuring processing capabilities on processor(s) 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, 26, 28, 30, 32, 34, 36 and/or 38 are illustrated in FIG. 1 as being implemented within a single processing unit, in implementations in which processor includes multiple processing units, one or more of modules 18, 20, 22, 26, 28, 30, 32, 34, 36 and/or 38 may be implemented remotely from the other modules. The description of the functionality provided by the different modules 18, 20, 22, 26, 28, 30, 32, 34, 36 and/or 38 described below is for illustrative purposes, and is not intended to be limiting, as any of modules 18, 20, 22, 26, 28, 30, 32, 34, 36 and/or 38 may provide more or less functionality than is described. For example, one or more of modules 18, 20, 22, 26, 28, 30, 32, 34, 36 and/or 38 may be eliminated, and some or all of its functionality may be provided by other ones of modules 18, 20, 22, 26, 28, 30, 32, 34, 36 and/or 38. As another example, processor 16 may be configured to execute one or more additional modules that may perform some or all of the functionality attributed below to one of modules 18, 20, 22, 26, 28, 30, 32, 34, 36 and/or 38.

A given client computing platform(s) 14 may include one or more processors configured to execute computer program modules. The computer program modules may be configured to enable an expert or user associated with the given client computing platform(s) 14 to interface with system 10, game server(s) 12, and/or external resources 42, and/or provide other functionality attributed herein to client computing platform(s) 14. By way of non-limiting example, the given client computing platform(s) 14 may include one or more of a desktop computer, a laptop computer, a handheld computer, a tablet computing platform, a NetBook, a Smartphone, a gaming console, and/or other computing platforms.

External resource(s) 42 may include sources of information, hosts and/or providers of virtual spaces outside of system 10, external entities participating with system 10, and/or other resources. In some implementations, some or all of the functionality attributed herein to external resources 42 may be provided by resources included in system 10.

Figure 2:
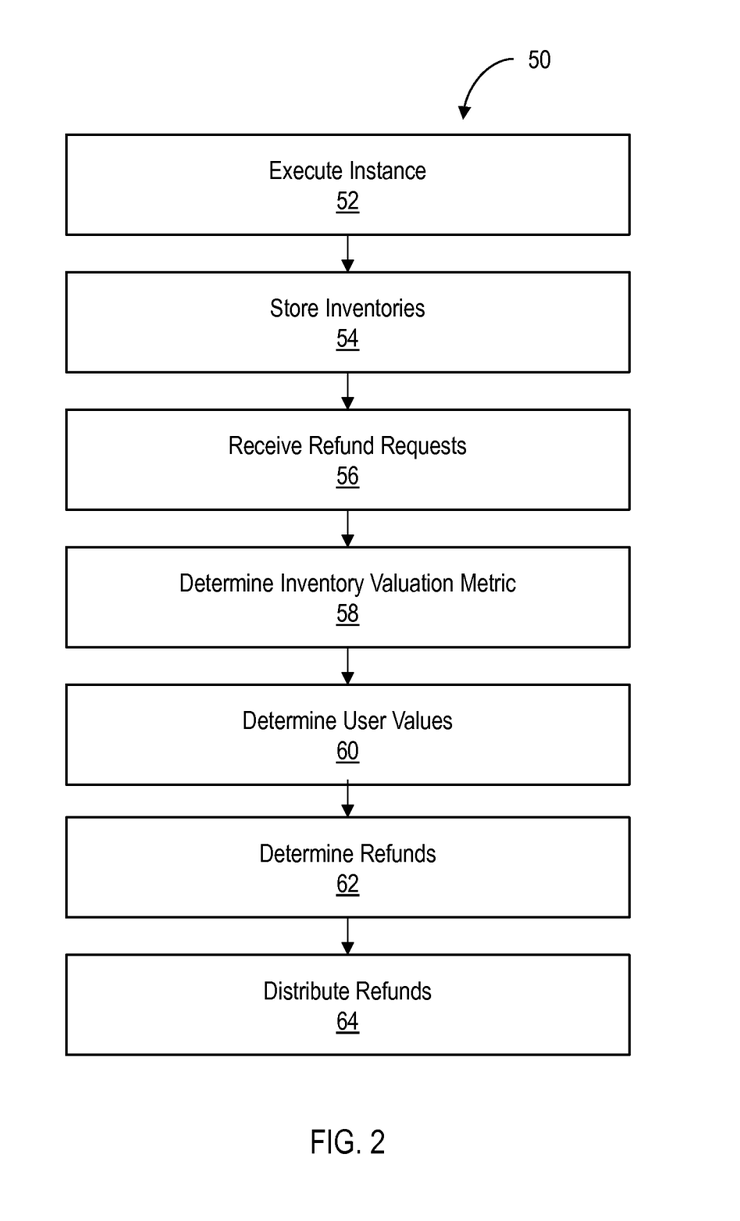
FIG. 2 illustrates an exemplary method of implementing a refund calculator in an online game, according to an aspect of the invention.

FIG. 2 illustrates a method 50 configured to implement a refund calculator in an online game, according to an aspect of the invention. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 2 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, an instance of a virtual space may be executed. In some implementations, operation 52 may be performed by a game module the same as or similar to game module 18 (shown in FIG. 1 and described above).

At an operation 54, the executed instance of the virtual space may be implemented to store inventories. The inventories may include a first inventory of items available to a first user in the game space. The items may include a first virtual item and/or any other item. A virtual item may be an item that can be used in the game instance by the user. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items. In some implementations, operation 54 may be performed by a user module the same as or similar to user module 20 (shown in FIG. 1 and described above).

At an operation 56, refund requests of a user may be determined. Refund requests for sets of one or more virtual items to be refunded into the inventories of the users in the game space may be determined. The requests may include a first refund request from the first user and/or any other user. In some implementations, operation 56 may be performed by an item request module the same as or similar to item request module 22 (shown in FIG. 1 and described above).

At an operation 58, the inventory valuation metrics may be determined. In some implementations, operation 58 may be performed by an item determination module the same as or similar to the item determination module 24 (shown in FIG. 1 and described above).

At an operation 60, user values may be determined. In some implementations, operation 60 may be performed by a user valuation module the same as or similar to the user valuation module 26 (shown in FIG. 1 and described above).

At an operation 62, refunds may be determined. A determination of one or more of a number of past refund requests, a value of refunds previously dispersed, and/or other aspects of previous refunds and/or refund requests may be made. An amount of refund requests of the users based on a period of time and/or any other parameter may be determined. The amount of refund requests may include a first amount of refund requests from the first user and/or any other user. In some implementations, operation 62 may be performed by a calculation module the same as or similar to the calculation module 34 (shown in FIG. 1 and described above).

At an operation 64, refunds may be distributed. In some implementations, operation 64 may be performed by a distribution module the same as or similar to the distribution module 36 (shown in FIG. 1 and described above).

Figure 3:
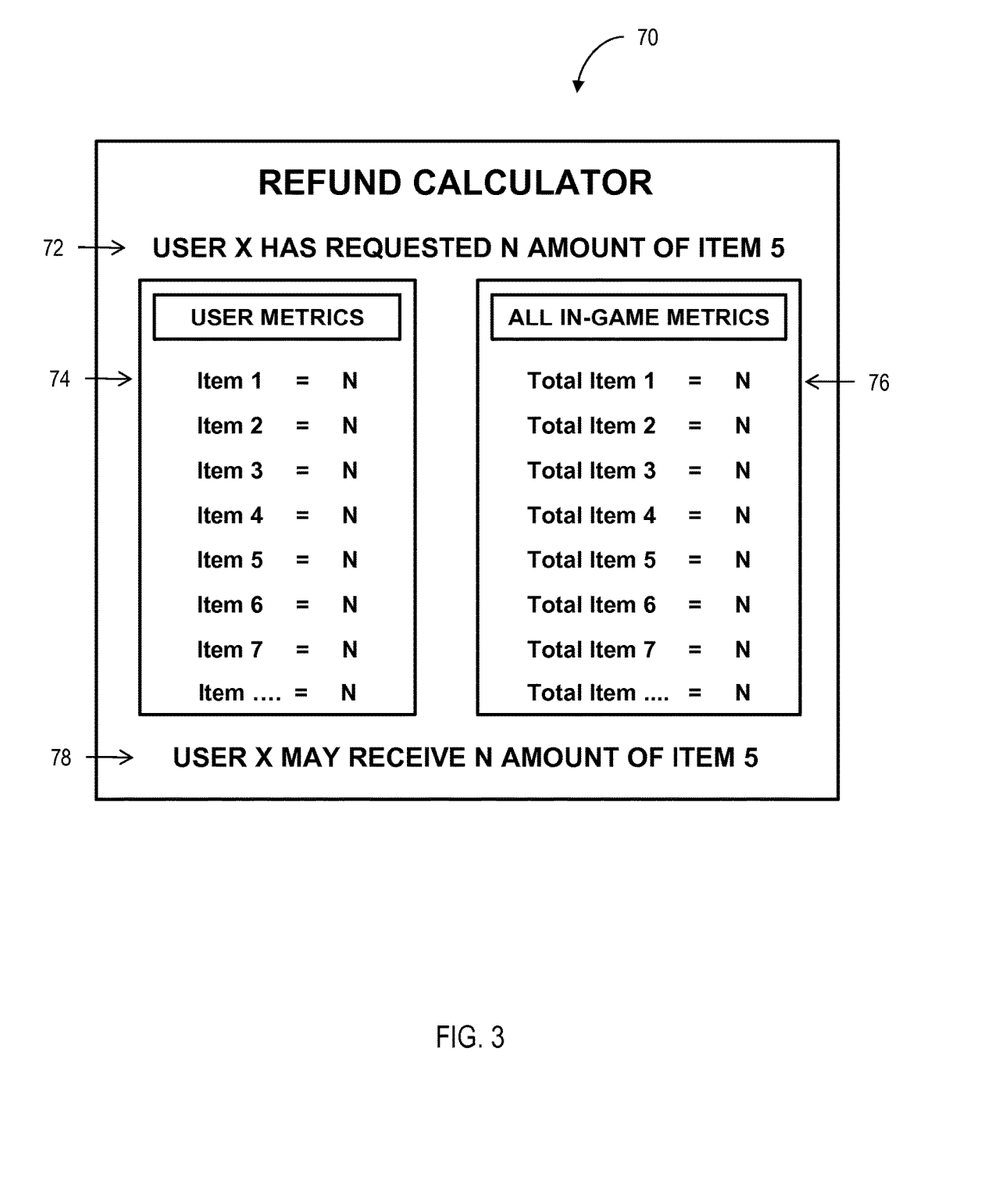
FIG. 3 illustrates an exemplary diagram of an operator interface which implements a refund calculator in an online game, according to an aspect of the invention.

FIG. 3 illustrates an exemplary diagram of an operator interface 70 which is configured to implement a refund calculator in an online game, according to an aspect of the invention. As shown, operator interface 70 enables an operator to determine: what items the user has requested 72, the user metrics 74, the total and/or all in-game metrics 76, and/or what items the user may receive 78. Based on the parameters shown, and/or any other in game parameters, a refund calculator may be implemented.

Figure 4:
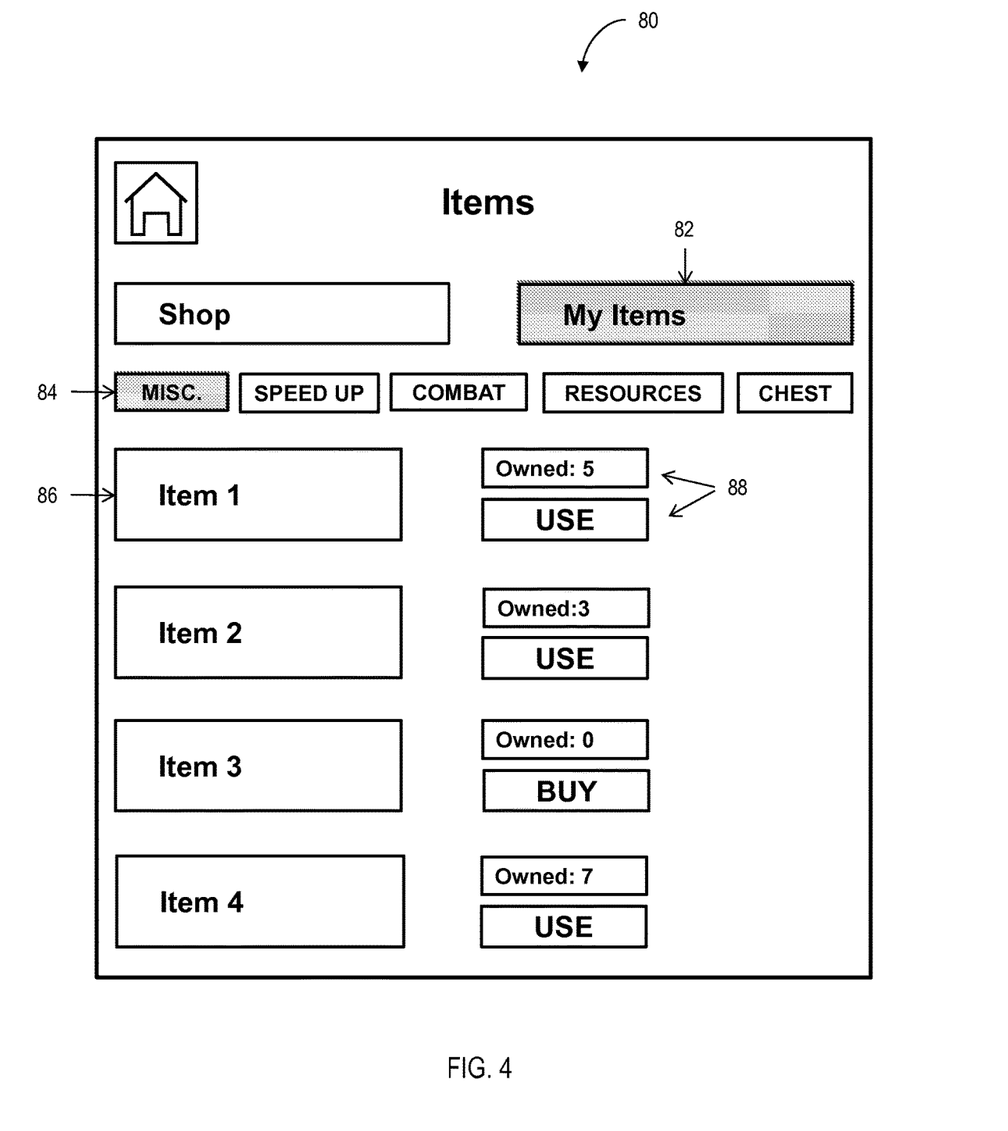
FIG. 4 illustrates an exemplary diagram of a user interface which implements a refund calculator in an online game, according to an aspect of the invention.

FIG. 4 illustrates an exemplary diagram of a user interface 80, according to an aspect of the invention. In some implementations, the user may select the "my items" 82 tab, and select from a category 84 of virtual in-game goods to use in game. In some implementations, the categories may include one or more: miscellaneous, speed up, combat, resources, chest, and/or any other category. Each category contains lists of items 86 that a user owns 88 and/or may use or purchase in game.

Figure 5:
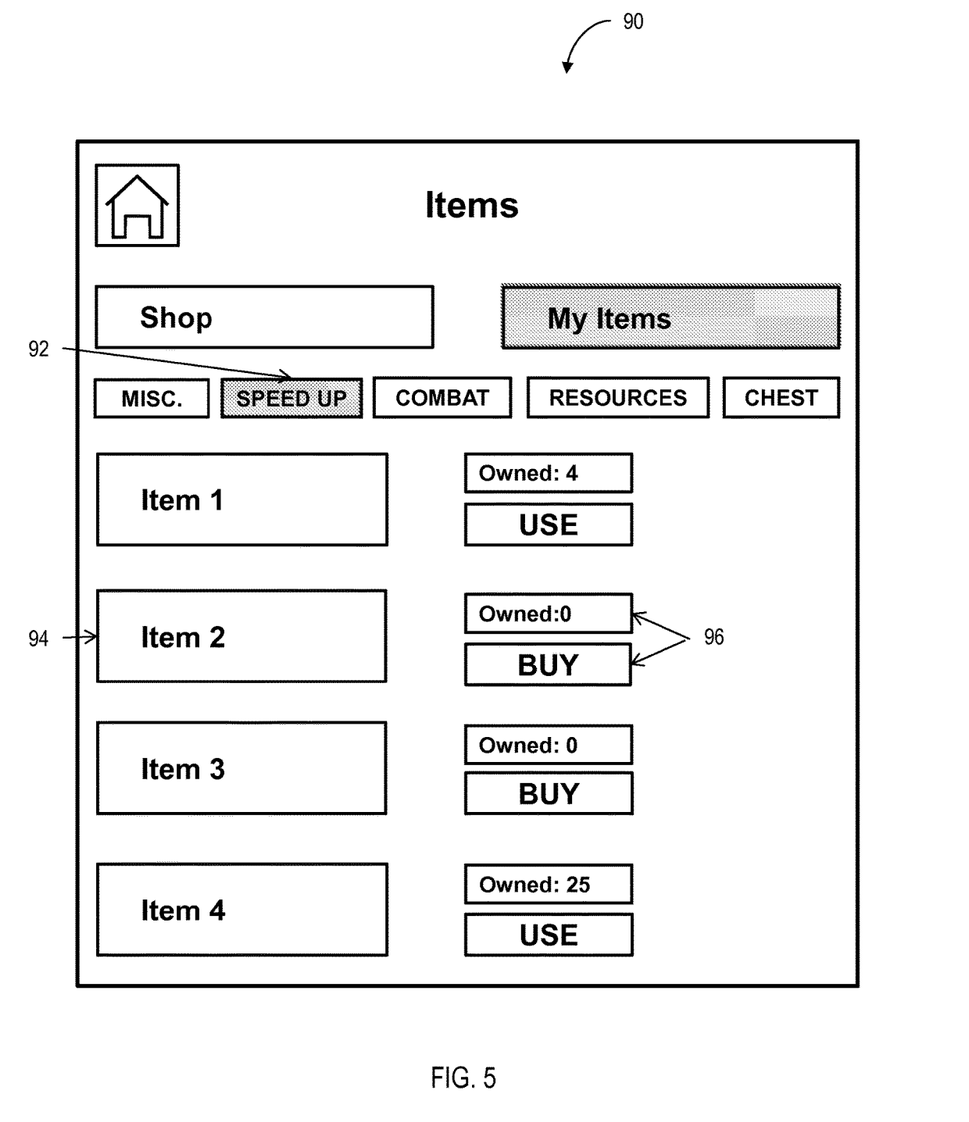
FIG. 5 illustrates an exemplary diagram of a user interface which implements a refund calculator in an online game, according to an aspect of the invention.

FIG. 5 illustrates an exemplary diagram of a user interface 90 according to an aspect of the invention. The user interface 90 may and allows purchase 96 of the item 94, from a particular category 92. Based on what is refunded by the refund calculator, a user may store an inventory of virtual items.

It would be understood by one of ordinary skill in the art that the interfaces may not be limited to the embodiment illustrated in FIGS. 3, 4 and 5. The interfaces may be associated with any objective, activity, action, or a combination thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for implementing a mechanism for automatically determining and distributing requested refunds of virtual items to users in an online game, the system comprising:
   one or more processors configured by machine-readable instructions to:
      execute a game instance of a game space, and to facilitate presentation of views of the game space to the users to enable interaction of the users with the game space and/or each other by performing operations in the game space in response to commands received from the users through client computing platforms associated with the users;

store inventories of items that are available to the users in the game space, the inventories including a first inventory of items available to a first user in the game space and a second inventory of items available to a second user in the game space;

receive, from the first user, a first refund request for a first set of one or more virtual items to be refunded into the first inventory;

receive, from the second user, a second refund request for a second set of one or more virtual items to be refunded into the second inventory;

determine user values, indicating value of the users, based on past user spending characterizing past spending by individual ones of the users in the online game, the user values including a first user value indicating a value of the first user and a second user value indicating a second value of the second user;

determine refunds in response to the first and second refund requests, wherein determination of the refunds is based on the determined user values, wherein the refunds are distributed into the inventories of the users without requiring an exchange of consideration by the users for the refunds, such that whether a first refund is to be distributed into the first inventory is determined based on the first user value and wherein the first refund is to be distributed without requiring the first user to exchange any consideration for the first refund, and further such that whether a second refund is to be distributed into the second inventory is determined based on the second user value and wherein the second refund is to be distributed without requiring the second user to exchange any consideration for the second refund;

responsive to a first determination that the first refund is to be distributed, distribute the first refund for the first set of one or more virtual items into the first inventory of the first user; and responsive to a second determination that the second refund is not to be distributed, the second refund for the second set of one or more virtual items is not distributed into the second inventory of the second user.

2. The system of claim 1, wherein the one or more processors are configured by machine-readable instructions such that the amount of past user spending in the online game is monitored by one or more of a spend velocity, a spend frequency, and/or a total amount spent.

3. The system of claim 1, wherein the one or more processors are configured by machine-readable instructions to determine an amount of power of the users based on in-game resources of the users, wherein the amount of power of the users includes a first amount of power corresponding to the first user.

4. The system of claim 3, wherein the one or more processors are further configured by machine-readable instructions to determine a quantity of one or more virtual items to distribute into the first inventory, wherein the quantity is based on the first amount of power.

5. The system of claim 1, wherein the one or more processors are configured by machine-readable instructions to determine an amount of refund requests of the users based on a period of time, wherein the amount of refund requests includes a first amount of refund requests from the first user.

6. The system of claim 5, wherein the one or more processors are further configured by machine-readable instructions to determine a quantity of one or more virtual items to distribute into the first inventory, wherein the quantity is based on the first amount of refund requests.

7. The system of claim 1, wherein the one or more processors are configured by machine-readable instructions to determine lifetimes of the users based on amounts of time the users have played the online game, wherein the lifetimes include a first lifetime of the first user.

8. The system of claim 7, wherein the one or more processors are configured by machine-readable instructions to determine a quantity of one or more virtual items to distribute into the first inventory, wherein the quantity is based on the first lifetime.

9. A computer implemented method for implementing a mechanism for automatically determining and distributing requested refunds of virtual items to users in an online game, the system comprising:
    executing an instance of a game space, and implementing the instance of the game space to facilitate participation by the users in the online game that takes place in the game space, wherein facilitating interaction of the users with the game space and/or each other by performing operations in the game space in response to commands received from the users through client computing platforms associated with the users;
    storing inventories of items that are available to the users in the game space, the inventories including a first inventory of items available to a first user in the game space and a second inventory of items available to a second user in the game space;
    receiving, from the first user a first refund request for a first set of one or more virtual items to be refunded into the first inventory;
    receiving, from the second user, a second refund request for a second set of one or more virtual items to be refunded into the second inventory;
    determining user values, indicating value of the users, based on past user spending characterizing past spending by individual ones of the users in the online game, the user values including a first user value indicating a value of the first user and a second user value indicating a second value of the second user;
    determining refunds in response to the first and second refund requests based on the user values, wherein the refunds are distributed into the inventories of the users without requiring an exchange of consideration by the users for the refunds, such that whether a first refund is to be distributed into the first inventory is determined based on the first user value and wherein the first refund is to be distributed without requiring the first user to exchange any consideration for the first refund, and further such that whether a second refund is to be distributed into the second inventory is determined based on the second user value and wherein the second refund is to be distributed without requiring the second user to exchange any consideration for the second refund;
    responsive to a first determination that the first refund is to be distributed, distributing the first refund for the first set of one or more virtual items into the first inventory of the first user; and
    responsive to a second determination that the second refund is not to be distributed, not distributing the second refund for the second set of one or more virtual items into the second inventory of the second user.

10. The method of claim 9, the method further comprising monitoring the amount of past user spending in the online game by one or more of a spend velocity, a spend frequency, and/or a total amount spent.

11. The method of claim 9, the method further determining an amount of power of the users based on in-game resources of the users, wherein the amount of power of the users includes a first amount of power corresponding to the first user.

12. The method of claim 11, wherein determining a quantity of one or more virtual items to distribute into the first inventory is based on the first amount of power.

13. The method of claim 9, further comprising determining an amount of refund requests of the users based on a period of time, wherein the amount of refund requests includes a first amount of refund requests from the first user.

14. The method of claim 9, wherein determining a quantity of one or more virtual items to distribute into the first inventory is based on the first amount of refund requests.

15. The method of claim 9, the method further determining lifetimes of the users based on amounts of time the users have played the online game, wherein the lifetimes include a first lifetime of the first user.

16. The method of claim 15, wherein determining a quantity of one or more virtual items to distribute into the first inventory is based on the first lifetime.

\* \* \* \* \*